United States Patent [19]

Gaines et al.

[11] 4,045,237

[45] Aug. 30, 1977

[54] CEMENTITIOUS COMPOSITIONS HAVING FAST-SETTING PROPERTIES AND INHIBITED SHRINKAGE

[75] Inventors: Robert W. Gaines, Darien; Dennison F. Fiala, Ridgefield; Henry Nash Babcock, Old Greenwich, all of Conn.

[73] Assignee: U.S. Grout Corporation, Old Greenwich, Conn.

[21] Appl. No.: 530,363

[22] Filed: Dec. 6, 1974

[51] Int. Cl.$^2$ ............................................. C04B 7/02
[52] U.S. Cl. .................................... 106/89; 106/97; 106/104; 106/109; 106/110
[58] Field of Search ............... 106/104, 89, 109, 110

[56] References Cited

U.S. PATENT DOCUMENTS

| | | | |
|---|---|---|---|
| 3,600,203 | 8/1971 | Aldera | 106/104 |
| 3,664,854 | 5/1972 | Kokuta | 106/104 |
| 3,775,143 | 11/1973 | Mikhailov et al. | 106/104 |
| 3,794,504 | 2/1974 | Babcock | 106/104 |
| 3,861,929 | 1/1975 | Deets et al. | 106/104 |

*Primary Examiner*—J. Poer
*Attorney, Agent, or Firm*—Pennie & Edmonds

[57] ABSTRACT

A cementitious composition which when mixed with water is capable of setting rapidly into a hard mass of high compressive strength without substantial shrinkage during setting and early hardening, which exhibits reduced long-term shrinkage, and which possesses a high degree of impermeability to liquid and vapor, is composed of a particulate mixture of portland cement, a calcined gypsum, and high alumina cement. Alternatively, such a cementitious composition can be composed of a particulate mixture of a high alumina cement and pressure calcined gypsum. Additional components such as surface active agents, gas generating or releasing agents and aggregate can be employed, if desired, for the selective improvement of specific properties.

5 Claims, No Drawings

CEMENTITIOUS COMPOSITIONS HAVING FAST-SETTING PROPERTIES AND INHIBITED SHRINKAGE

BACKGROUND OF THE INVENTION

This invention relates to improvements in hydraulic cementitious compositions such as concrete, mortar, grout and the like. More particularly, it relates to a cementitious composition which when mixed with water is capable of setting in a relatively short period of time to form a hard mass of high compressive strength without substantial shrinkage during setting and early hardening, which exhibits no substantial long-term shrinkage, and which possesses a high degree of impermeability to fluids.

The term "hydraulic cement" as used herein, is understood to include any cement which has the characteristic of hardening under water e.g., portland cement, blends of portland cement and natural cement, pozzolanic cements, slag cement, masonry cement, oil well cement, white portland cement, mixtures of portland cement and blast-furnace cement, and like materials. The term "concrete" is used to designate a mixture of hydraulic cement, aggregate, and water. This material sets to form a hard mass. The "aggregate" may be mineral or non-mineral, including naturally occurring materials such as sand, gravel or quarried rock, or manufactured aggregate such as expanded shale, clay, and the like. The term "mortar" is used herein to designate a mixture of hydraulic cement, fine aggregate and water. The term "grout" designates a mixture of hydraulic cement and water, and sometimes fine sands. Grouts normally have higher fluidity than mortars and can be pumped through pipe lines and forced into small spaces, for instance, into voids or cracks or porous concrete, or into spaces between preplaced aggregate or under machinery and heavy equipment. A more thorough description of cement technology suitable for an understanding of the background of the present invention can be found in Scientific American, April 1964, pages 80–90; Kirk-Othmer's Encyclopedia of Chemical Technology, 2d ed., Vol. 5, pages 684–710 (1964); and ACI Journal, August, 1970, pages 583–610.

In the construction industry, and particularly in the repair of concrete structures such as highways and structural walls and platforms, and the filling of voids and holes to form stable underpinnings or foundations for machinery and heavy equipment, there has been a long felt need for cementitious compositions which will set within a relatively short period of time into a hard mass with sufficient strength to withstand applied stresses and loads. In order to have commercial value, this type of cementitious composition must also have good bonding characteristics, early as well as long-term strength, practical field workability times, and be capable of withstanding freezing and thawing as well as the action of salts and the corrosive substances. Advantageously, the cementitious composition should also possess self-leveling properties so that the resultant material, when used in patching operations, will not create cavities or crown which would cause damage to the adjacent area of the structure. In addition, the applied composition should possess fluid barrier properties so that they are impermeable to liquid and vapor, particularly moisture.

Attempts have been made in the past to formulate cementitious compositions possessing one or more of the above properties, but such attempts, particularly when directed to the achievement of all of the foregoing desirable properties in a single composition, have met with only limited success. For example, compounds such as calcium chloride and other known setting-time accelerators have been incorporated in prior formulations, but the resulting products were characterized by undesirable shrinkage, high heat generation, and lack of resistance to freezing and thawing. Cement formulations made from plastics such as epoxy resins have been used for repairing concrete structures, but the lack of compatability between the plastic cement and concrete has precluded the extended use of this type of formulation. Other attempts at formulating improved cement compositions have been only partially successful mainly because the resulting products after mixing with water and placement using the customary techniques have failed to develop acceptable strengths within a desirably short period of time after setting without shrinkage. Furthermore, the failure of many of these products to achieve a high degree of impermeability to fluids, particularly water, has precluded their use in certain applications, e.g., grouting and water proofing, where that property is often critical. Thus, mixtures of portland cement and high alumina cement have been formulated as described in Chemistry and Industry, 1952, pages 2–7. Mixtures of various cements with gypsum and its dehydration products (which is known to affect the setting rate of the cement) are described in Budnikov, Fourth International Symposium on the Chemistry of Cement (1960), pages 469–477; Monfore, Journal PCA Research & Dev. Laboratories, May, 1964, pages 2–9; Greceanu, Proc, Conf. Silicate Industry, 9, 243–4 (1967); British Pat. Nos. 317,783 and 474,917; and U.S. Pat. Nos. 3,794,504 and 3,775,143.

Accordingly, it is an object of the present invention to provide a cementitious composition which when mixed with water will set within a relatively short period of time into a hard mass of sufficient strength and bonding characteristics to withstand applied stresses and loads.

Another object is to provide a cementitious composition which when mixed with water will set within a relatively short but practical field working time into a hard mass of high early and long-term strength without substantial shrinkage during either setting and early hardening or over the useful working life of the mass.

Another object is to provide a cementitious composition which when mixed with water will possess good leveling properties and set within a relatively short time into a hard mass which is capable of withstanding freezing and thawing and the action of salts and other corrosive substances, and which possess high fluid barrier properties so as to be essentially impermeable to liquid and vapor, particularly water.

These and other objects of the invention as well as a fuller understanding of the advantages thereof, can be had by reference to the following detailed description and claims.

SUMMARY OF THE INVENTION

The foregoing objects are achieved according to the present invention by the discovery of a novel cementitious composition comprising a particulate admixture of portland cement, calcined gypsum and a high alumina cement in the proportions specified hereinbelow. Additionally, cementitious compositions of the present invention can comprise a mixture of particles of high alumina cement and a specific type of calcined gypsum known as "pressure calcined gypsum" without the use of portland cement.

The terms "portland cement" and "high alumina cement" as used herein include those materials as normally understood in the art. The forms of portland cement suitable for use in the present invention are as described in the above-mentioned Scientific American and Encyclopedia of Chemical Technology articles, with the so-called "type III" or "high early strength" portland cement being especially preferred. High alumina cement is understood to mean a cementitious material which is relatively high in tricalcium aluminate. An example of a commercially available high alumina cement suitable for use in the invention is sold by the La Farge Aluminous Cement Company Ltd. under the trade name of "Fondu".

Calcined gypsum suitable for use in the present invention includes those forms of the mineral which have been heated at atmospheric pressure to drive off at least a portion of the water of hydration so that the resulting material, called "normal calcined gypsum", contains, on the average, between ½ and 2 molecules of water per molecule of $CaSO_4$.

Generally speaking, normal calcined gypsum (also known in the art as $\beta$-gypsum or plaster of paris) is substantially composed of a mixture of $CaSO_4.\frac{1}{2}H_2O$ and $CaSo_4$, although $CaSO_4.\frac{1}{2}H_2O$ (calcium sulfate hemihydrate) and $CaSO_4$ (anhydrite) are per se suitable for use in the present invention. The chemistry of these substances is well known in the art and a detailed description of gypsum dehydration products ca be found in Kirk-Othmers' Encyclopedia of Chemical Technology, 2d ed., Vol. 4, pages 14-27 (1964) and W. C. Hansen, Gypsum & Anhydrite in Portland Cement published in 1969 by United States Gypsum Company. Also included within the class of calcined gypsums suitable for use in the present invention is so-called "pressure calcined gypsum" available from Georgia-Pacific Corporation under the trade name of "K-5" or from United States Gypsum Company under the trade name of "Hydro-Stone". According to British Pat. No. 1,901,051, pressure calcined gypsum can be obtained by heating gypsum in a closed container with steam at 225°-300° F. under a pressure of approximately 17 p.s.i.g.

In formulating the compositions of the present inventions from portland cement, calcined gypsum and high alumina cement, it is critical to employ between 0.1 and 10 percent of portland cement, between 0.1 and 40 percent of calcined gypsum, and between 50 and 90 percent of high alumina cement, the aforesaid percentages being based on the total weight of the three components. Preferably, the compositions are formulated to contain between 1 and 5 percent of portland cement, between 5 and 20 percent of calcined gypsum, and between 50 and 85 percent of high alumina cement.

In formulating the cementitious compositions of the present invention from high alumina cement and pressure calcined gypsum alone, the two components can be combined within wide ranges of proportions, although the particular proportions should be selected to provide the required high early strength for the intended use of the compositions. Generally, the two components are combined in amounts of between 0.1 and 40 weight percent and preferably between 5 and 20 weight percent pressure calcined gypsum, and the balance high alumina cement. It is a feature of the invention that pressure calcined gypsum, when intimately admixed with high alumina cement in the proportions indicated above, gives rise to a new material which is surprisingly effective as a cementitious composition even the absence of portland cement.

In addition to the foregoing essential constituents of the cementitious compositions of the invention, adjuvants can be incorporated, such as aggregate in amounts up to about 80 percent by weight of the portland cement, calcined gypsum and high alumina cement for increased structural strength, surface active agents to enhance the wetability of the particles, and particulate materials capable of generating gas or releasing entrapped gas during the setting period to impart a predetermined degree of expansion to the composition.

Particulate materials capable of generating gas or releasing entrapped gas during the setting period to cause the resulting product to expand and thereby function as an expansive component of the composition include the major types of known adsorbents such as activated alumina and bauxite, aluminum silicate, bone char, wood char, activated carbon, magnesia, silica gel, magnesium silicate, delayed coke and fluid coke. Some of these adsorbents require special treatment before they can be considered for controlling the shrinkage of the cementitious system. The treatment, however, generally involves simply drying the expansive component to reduce the moisture content therein to below about 3 percent by weight. The aforesaid adsorbents, with the exception of fluid coke, are available commercially in a variety of grades and particle sizes and generably have low moisture content, so further treatment is not required. Although the particle size of these adsorbents is not critical, we prefer to use adsorbents with a majority of their particles below about 20 Tyler mesh and more preferably below about 30 Tyler mesh. Within the size range selected, these adsorbents will provide a sufficiently fast release rate so that a major portion of the entrapped gas will be released while the cementitious system is still in a plastic state.

The preferred expansive component for use in the present invention is fluid coke which is a by-product of the fluid coking process for the thermal conversion of heavy hydrocarbon oils to lighter fractions. A detailed description of this material and its use as an expansive component can be found in U.S. Pat. No. 3,794,504.

The amount of the adsorbent to be used in the practice of the present invention depends on the degree of expansion desired in the particular cementitious system and also, to a large extent, on the amount of evaporation taking place. Generally speaking, the adsorbent can be used in amounts of up to 90 percent by weight of the dry cementitious composition. In the preferred case of fluid coke, the amount required for achieving expansion during the setting of a cementitious system with a "normal amount of evaporation" is desirably less than 10% and preferably between about 3 and 10 percent by weight of the total composition, provided, of course, that the moisture content of the coke is below about 3% by weight. The term normal amount of evaporation stated hereinabove refers to the amount of water evaporated at the first 3½ hours during setting and early hardening of the concrete mass at ambient conditions of 70° to 80° F. and 10 to 30% relative humidity. The amount of water evaporated under laboratory conditions stated above is less than 0.5% of the total weight of the aqueous hydraulic cement mixture. In actual practice, the amount of fluid coke used may be much less than 10% if the moisture content of the fluid coke is controlled to below the preferred range of 1%.

Under "no evaporation" conditions, which is recommended for setting almost all types of cement mixtures but is seldom practiced or realized in actual field conditions, further reduction of the amount of adsorbent to be used can be realized.

Surface active agents can be advantageously employed in formulating the cementitious composition of the invention and can serve one or more purposes, e.g., as wetting agents to improve the wetability of the particles of the composition as well as their water retention properties, as dispersing agents and air entraining agents. A typical surface active agent suitable for use in the present invention is Lomar LS, which is a condensed naphthalene sulfonate produced by Nopco Chemical Company.

DESCRIPTION OF PREFERRED EMBODIMENTS

The following examples are presented for the purpose of illustrating (without limitation) the novel cementitious compositions of the invention and the advantages thereof. In the examples, parts and percentages are by weight unless otherwise indicated.

EXAMPLE I

The following ingredients are weighted into a stainless steel mixing vessel and thoroughly stirred with a stainless steel spoon until well mixed while in the dry powder state:

| Material | Percent | Grams |
|---|---|---|
| Portland cement (type III) | 1.0 | 2.0 |
| Plaster of Paris | 17.2 | 34.4 |
| High Alumina Cement | 81.8 | 163.6 |

Tap water at 70° F. is added to the vessel and the contents thereof are stirred to form a mix of consistency sufficiently workable to permit placement in a homogeneous manner without risk of settling or of causing placement discontinuities.

A portion of the mix is placed in a plastic cup and covered with a clear plastic film to prevent evaporation with its attendant cooling and slowing of the setting rate. The moment of setting was determined with Vicat apparatus in accordance with the teachings of ASTM Procedure 191-74. The time elapsed from addition of water to resistance to penetration is labeled "Vicat setting time" which in this case is 48 minutes.

Four castings 4.7 cm base diameter and about 9 mm thick are made in sytrofoam cups. The castings are leveled and consolidated and cured for stated periods above water further protected from evaporation by plastic film.

The moisture permeability of the castings is determined for stated curing times by submitting one side of the casting to 25-27 p.s.i. water pressure and the other side to a dessicant (Drierite) weighed at the start and at periodic intervals. The castings are gasketed with neoprene washers having 1¼ holes for both water access and vapor egress to the dessicant. Compressing members are floor flanges with a half-inch I.P.T. opening held together by four bolts on a 2½ bolt circle. The dessicant is contained in a ½ inch × 1½ inch pipe nipple capped at one end.

The absorption of water passing through 47A1 disc-which is 0.345 inch (8.87 mm) thick is as follows:

| Days After Casting | Test Interval Hours | Moisture Picked Up By Dessicant, G | Permeability Constant, K |
|---|---|---|---|
| 2-3 | 18.0 | 0.16 | 0.0788 |
| 3-4 | 28.75 | 0.10 | 0.0308 |
| 4-6 | 43.0 | 0.21 | 0.0433 |
| 6-7 | 24.0 | 0.05 | 0.0185 |
| 7-8 | 18.88 | 0.08 | 0.0376 |
| 8-9 | 24.11 | 0.08 | 0.0295 |

The determination of the permeability constant, K, follows the equation:

$$\text{Flow Rate (gm/hr)} = K \times \frac{\text{Pressure Drop} \times \text{Area (mm}^2\text{)}}{\text{Thickness (mm)}}$$

or $$K = \frac{gm}{hr} \times \frac{\text{Thickness}}{\text{Area} \times \text{Pressure Drop}}$$

The grams per hour and the thickness are the variables, and the area and pressure drop are constants in all tests and are not computed in deriving the K values presented here. If pressure differentials other than 25-27 p.s.i. or gasket hole diameters other than 1¼ inches were employed, further computations would be easily effected (and a different permeability coefficient number would result).

Without wishing to be bound by theory, it is believed that the reduction of the permeability K value with time is caused partly by the drying of the side of the disc toward the dessicant and partly by the continuation of cure on the wet side.

EXAMPLE II

The procedure of Example I is repeated for a composition of the present invention derived from portland cement, normal calcined gypsum (plaster) and high alumina cement (HAC) as well as for some prior art compositions including those which have heretofore been employed for water proofing purposes. The 6-day permeability constants reported for these formulations are reported in Table 1, below:

Table 1

| Formulation | | Permeability Constant, K |
|---|---|---|
| 1. Portland cement (type III) | 5% | 0.078 |
| Plaster | 19% | |
| HAC | 76% | |
| 2. Portland cement (type I) | 50% | 70.0 |
| Sand | 50% | |
| 3. Portland cement (type III) | 90% | 0.170 |
| Plaster | 10% | |
| 4. Plaster | 10% | 0.072 |
| HAC | 90% | |
| 5. Portland cement (type III) | 50% | leaks |
| HAC | | |
| 6. HAC | | 0.030 (cracks) |
| 7. Glass disc (standard) | | 0.003 |
| 8. MX expansive cement | | leaks |

From the above data, it can be seen that the K-constant for the portland cement/plaster/HAC composition of the present invention compares favorably with the portland cement/sand and MX expanding cement formulations heretofore conventionally used for water-proofing purposes.

EXAMPLE III

An amount (250 parts) of water are added to an intimate dry admixture of 99 percent (990 parts) of Fondu brand high alumina cement and 1 percent (10 parts) of Hydrostone pressure calcined gypsum. The system is stirred to an evenly-textured, flowable mix which is poured into 4 ounce wax cups. The composition sets within the cups in 15–20 minutes without any noticeable shrinkage, surface cracks or friability.

The cement castings are removed from the wax cups and pressure tested intervals of 4 hours and 24 hours after placement. At 4 hours, the cast cement, which is still hot (about 130° F.) exhibits a compressive load-bearing capacity of 10,600 pounds. After 24 hours following placement, the material has acquired a load strength at break of 16,800 pounds.

EXAMPLE IV

In the manner of Example III, and amount (250 parts) of water are added to an intimate dry admixture of 95 percent (950 parts) of high alumina cement and 5 percent (50 parts) of pressure calcined gypsum. The resulting stirred, flowable mixture is placed into cups and allowed to undergo setting which occurs in 10–15 minutes without noticeable shrinkage, surface cracks or exhibiting a dusty surface.

The cement castings are removed from the cups and pressure tested at intervals of 4 and 24 hours after placement. Unlike the castings obtained in Example III, the product of this example exhibits a 4-hour compressive load strength of 75 pounds but which increases after 24 hours to 14,200 pounds, which is a value comparable to that obtained in Example III.

EXAMPLE V

Using the procedure of Example III, test castings were made using cementitious compositions of the present invention made from K-5 pressure calcined gypsum and Fondu high alumina cement in varying proportions. The compressive load strengths of the castings at 4 hours and 6 hours after placement are summarized in Table 2, as follows:

Table 2

| Parts of pressure calcined gypsum | Parts of high alumina cement | Load Strength (p.s.i.) | |
|---|---|---|---|
| | | 4 hour | 6 hour |
| 1 | 99 | no set | 3500 |
| 50 | 50 | 115 | 2660 |
| 95 | 5 | 3370 | 3540 |
| 99 | 1 | 3380 | 3500 |

The above data indicate the broad range of proportions of high alumina cement and pressure calcined gypsum which can be employed in formulating the cementitious compositions of the invention to achieve attractive compressive load strengths within the relatively short time period of 6 hours.

We claim:

1. A cementitious composition which when mixed with water is capable of setting into a hard mass in a short period of time without substantial shrinkage during setting and early hardening, and possessing a high degree of impermeability to fluids, said composition comprising:
    a. between 0.1 and 10 weight percent of portland cement;
    b. between 0.1 and 40 weight percent of a calcined gypsum selected from the group consisting of normal calcined gypsum, anhydrite, and pressure calcined gypsum; and
    c. between 50 and 90 percent of high alumina cement.

2. A cementitious composition according to claim 1, said composition containing additionally up to about 80 percent by weight of aggregate, based on the total weight of the components in (a), (b) and (c).

3. A cementitious composition according to claim 2, said composition containing additionally a particulate material capable of generating a volume of gas or capable of releasing a volume of entrapped gas during setting and early hardening while in contact with water.

4. A cementitious composition according to claim 3, said composition containing additionally a surface active agent.

5. A cementitious composition which when mixed with water is capable of setting into a hard mass in a short period of time without substantial shrinkage during setting and early hardening and possessing a high degree of impermeability to fluids, said composition comprising:
    a. between about 1 and 5 percent by weight of a Type III portland cement;
    b. between about 5 and 20 percent by weight of a calcined gypsum selected from the group consisting of normal calcined gypsum, anhydrite, and pressure calcined gypsum; and
    c. between about 50 and 85 percent by weight of a high alumina cement.

* * * * *